(12) United States Patent
Wu

(10) Patent No.: US 12,103,251 B2
(45) Date of Patent: Oct. 1, 2024

(54) COMPOSITE MATERIAL MANUFACTURING EQUIPMENTS

(71) Applicant: Enerage Inc., Yilan County (TW)

(72) Inventor: Mark Y. Wu, Yilan County (TW)

(73) Assignee: ENERAGE INC., Yilan County (TW)

(*) Notice: Subject to any disclaimer, the term of this patent is extended or adjusted under 35 U.S.C. 154(b) by 92 days.

(21) Appl. No.: 17/859,744

(22) Filed: Jul. 7, 2022

(65) Prior Publication Data

US 2024/0075696 A1 Mar. 7, 2024

(30) Foreign Application Priority Data

May 25, 2022 (TW) .................................. 111119553

(51) Int. Cl.
  *B29C 48/52* (2019.01)
  *B29C 70/26* (2006.01)
  *B29C 70/46* (2006.01)
  *B29K 307/04* (2006.01)

(52) U.S. Cl.
  CPC .............. *B29C 70/46* (2013.01); *B29C 70/26* (2013.01); *B29K 2307/04* (2013.01)

(58) Field of Classification Search
  CPC ... B29C 70/523; B29C 70/526; B29C 70/546; B29C 48/52; B29C 48/56; B29C 48/685; B29C 48/686; B29C 48/687; B29C 48/688
  See application file for complete search history.

(56) References Cited

U.S. PATENT DOCUMENTS

| | | | | |
|---|---|---|---|---|
| 2,685,707 A | * | 8/1954 | Llewellyn | D01D 5/04 508/106 |
| 3,008,187 A | * | 11/1961 | Slade | B29C 48/09 264/211 |
| 3,697,209 A | * | 10/1972 | Schiesser | B29C 48/153 425/114 |
| 3,748,074 A | * | 7/1973 | Nitta | B29C 48/465 425/207 |
| 6,073,657 A | * | 6/2000 | Hippelainen | F16L 9/147 138/125 |

(Continued)

OTHER PUBLICATIONS

Mount III, E.M., 12—Extrusion Processes, Applied Plastics Engineering Handbook (Second Edition) (2017), pp. 217-264. (Year: 2017).*

*Primary Examiner* — Matthew J Daniels
(74) *Attorney, Agent, or Firm* — Muncy, Geissler, Olds & Lowe, P.C.

(57) ABSTRACT

Disclosed is a composite material manufacturing equipment including a raw material cylinder, an oil hydraulic piston and a rotating mold. The raw material cylinder has a raw material chamber, a material inlet and a material outlet, the raw material chamber can be filled with a substrate and a reinforcing phase material. The oil hydraulic piston is arranged at a side of the material inlet of the raw material cylinder for pushing the substrate and the reinforcing phase material to move towards the material outlet. The rotating mold is arranged at a side of the material outlet of the raw material cylinder, and includes an outer mold and a rotating flow channel inside the outer mold, the outer mold can rotationally rub the substrate to plasticize the substrate, the rotating flow channel can disperse and mix the plasticized substrate and the reinforcing phase material to form a composite material.

3 Claims, 13 Drawing Sheets

(56) References Cited

U.S. PATENT DOCUMENTS

| | | | | |
|---|---|---|---|---|
| 6,309,574 B1* | 10/2001 | Jarvenkyla | ............ | B29C 48/152 264/211.21 |
| 6,722,778 B2* | 4/2004 | Kirjavainen | ............ | B29C 48/09 366/98 |
| 2014/0103135 A1* | 4/2014 | Chelminski | ........... | F41B 9/0037 239/11 |

* cited by examiner

COMPOSITE MATERIAL MANUFACTURING EQUIPMENTS

CROSS-REFERENCE TO RELATED APPLICATION

This application claims the priority of Taiwanese patent application No. 111119553, filed on May 25, 2022, which is incorporated herewith by reference.

BACKGROUND OF THE INVENTION

1. Field of the Invention

The present application relates to a manufacturing equipment, and more particularly, to a composite material manufacturing equipment.

2. The Prior Arts

As the development of science and technology and the rising of environmental consciousness, the requirements for properties, such as electrical conductivity, thermal conductivity, mechanical strength, weather resistance, manufacturing cost, of materials in industrial fields, such as electrical engineering, electronics, chemical engineering, transportation, mechanics, are also getting higher and higher. Taking conductive materials as an example, copper has an electrical conductivity higher than that of aluminum, but has poor mechanical strength and poor high-temperature deformation resistance; while taking the casing material of aircraft as an example, aluminum has low density, high strength and high ductility, but has poor corrosion resistance and poor impact resistance; therefore, in the prior arts, the composite materials with required properties are manufactured by means of alloys, additives, heat treatment, etc.

The composite materials are made of continuous phase matrix (such as metal, alloy and polymer) and reinforcing phase materials, which have the advantages of both metal and reinforcing phase materials. Taking metal matrix composites as example, powder metallurgy and mold casting are often used to manufacture metal matrix composites in the industries. In the powder metallurgy, the metal matrix composites are formed mainly by mixing powders of metal and reinforcing phase materials by a mechanical mean, and then processing the mixed materials by methods such as pressureless sintering, vacuum hot pressing sintering, high pressure torsion, hot extrusion, hot rolling.

FIG. 1 schematically illustrates a conventional composite material manufacturing equipment. As shown in FIG. 1, to manufacture the metal matrix composite by a conventional composite material manufacturing equipment 1 includes following steps of: filling a powdered metal matrix M and a powdered reinforcing phase material S in two barrels 11, 12, respectively; feeding the powdered metal matrix M and the powdered reinforcing phase material S into a heating device 14 by a suction machine 13; heating and stirring the powdered metal matrix M and the powdered reinforcing phase material S to form a slurry P of composite material in the heating device 14; and spraying the slurry P into a pressure casting mold 16 to form a metal matrix composite C.

However, surface properties of the reinforcing phase material of nanoscale are different from those of the continuous phase matrix, so that the reinforcing phase material is hard to be uniformly dispersed in the matrix, and thus the composite material thereof cannot achieve desired properties; in particular, graphene is the reinforcing phase material which has received extremely high attention and researches. Due to the instability of two-dimensional crystals in terms of thermodynamic properties, whether the graphene exists in a free state or is deposited in a substrate, the graphene is not completely flat, with microscopic three-dimensional scale wrinkles on its surface, and such wrinkles will cause agglomeration of the graphene through Van der waals force, and the wettability between the graphene and the substrate (such as metal, alloy, resin) is poor, thereby it is more difficult for graphene to be uniformly dispersed in the substrate. The existing composite material manufacturing equipment cannot effectively solve the problems of agglomeration of reinforcing phase nanomaterials in the substrate.

SUMMARY OF THE INVENTION

In order to solve various problems of the prior art, the present application provides a composite material manufacturing equipment including a raw material cylinder, an oil hydraulic piston and a rotating mold. The raw material cylinder has a raw material chamber capable of being filled with a substrate and a reinforcing phase material, and a material inlet and a material outlet located at opposite sides of the raw material chamber, wherein the substrate is in a form of column, and the reinforcing phase material is in a form of powder. The oil hydraulic piston is arranged at a side of the material inlet of the raw material cylinder, for pushing the substrate and the reinforcing phase material to move towards the material outlet. The rotating mold is arranged at a side of the material outlet of the raw material cylinder, and includes an outer mold and a rotating flow channel inside the outer mold, wherein the outer mold can rub the substrate to plasticize the substrate, and the rotating flow channel can disperse and mix the plasticized substrate and the reinforcing phase material to form a composite material.

In an embodiment, the substrate is metal, alloy or polymer, the reinforcing phase material is graphene.

In an embodiment, wherein the outer mold includes a rubbing part, a heat insulating part and a forming part, the heat insulating part is sandwiched between the rubbing part and the forming part, the rotating flow channel passes through the rubbing part, the heat insulating part and the forming part, an inlet of the rotating flow channel is located at the rubbing part, an outlet of the rotating flow channel is located at the forming part, the rubbing part can rotationally rub the substrate, the heat insulating part can insulate heat generated by the rubbing part rotationally rubbing the substrate, and the forming part can cool the composite material.

In an embodiment, a plurality of spiral guide grooves is formed on a surface of the rubbing part, and the plurality of spiral guide grooves communicates with the rotating flow channel.

In an embodiment, the rotating mold further includes an inner mold disposed inside the outer mold, and the rotating flow channel is located between the outer mold and the inner mold.

In an embodiment, the outer mold has inner lugs formed on an inner surface thereof, the inner mold has outer lugs formed on an outer surface thereof, the inner lugs and the outer lugs are in a stagger arrangement, when the outer mold rotates relative to the inner mold, the inner lugs and the outer lugs generate the shear force to disperse and mix the substrate and the reinforcing phase material.

In an embodiment, the outer mold and the inner mold are cone-shaped, and the rotating flow channel extends at an oblique angle of 15-30° with respect to the horizontal direction.

In an embodiment, the inner mold has a conical surface in contact with the substrate, and a plurality of spiral guide grooves is formed on the conical surface.

In the composite material manufacturing equipment of the present application, the raw material chamber of the raw material cylinder can be filled with the substrate in the form of column and the reinforcing phase material in the form of powder, the oil hydraulic piston can push the substrate and the reinforcing phase material to move towards the material outlet, the outer mold of the rotating mold can rotationally rub the substrate to plasticize the substrate, the rotating flow channel can disperse and mix the plasticized substrate and the reinforcing phase material to form the composite material; the manufacturing process does not require heating, the reinforcing phase material is uniformly dispersed in the substrate, and there is no phase separation in the obtained composite material, which can be available for subsequently processing applications in various industries.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE EMBODIMENTS

Figure 1:
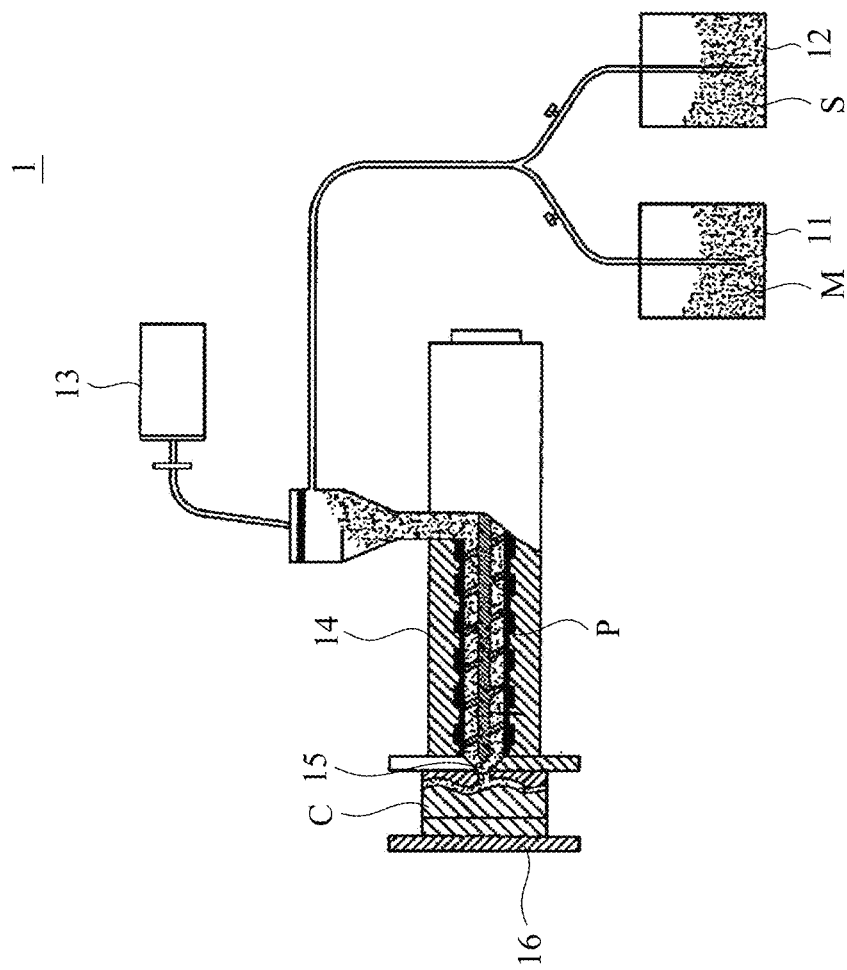
FIG. 1 is a schematic cross-sectional view of a conventional composite material manufacturing equipment.

Hereinafter, the embodiments of the present invention will be described in more detail with reference to the drawings and reference numerals, in order that those skilled in the art can implement the present invention accordingly after studying the present description. The terminology used herein is used to describe particular embodiments only, and is not intended to limit the present invention. Unless it is clearly indicated in the context otherwise, the terms used herein include both singular and plural forms, and the term "and/or" includes any and all combinations of one or more of the associated listed items.

A solid material under the rubbing of external force will generated particles of a size less than 20 μm on its surface, a temperature of the solid material rises to a critical temperature Tc for plasticization (which is between the melting point Tm of the solid material and 70% of the melting point Tm) by continuously applying force to rub it, and the plasticized material can generate thixotropy by repeatedly cooling and rubbing to heat it and simultaneously applying a varying shear force thereto. Thixotropy refers to a phenomenon that a viscosity of an object becomes less (or greater) when the object receives the shear force, while the viscosity of the object becomes greater (or less) when the shear force is stopped; that is, the structure of the object changes reversibly and the object has superplasticity (a particularly high elongation and not to be broken). The material with thixotropy generated has an appearance of paste-like slurry (the volume of solid phase accounts for up to 80%), and contains fine crystal particles which are not connected to each other in the interior. Continuous to stir the thixotropic slurry can prevent the fine crystal particles from contacting with each other to form large crystal particles; at this time, if other materials of appropriate size are mixed with the thixotropic slurry by a specific method, the effect of uniformly dispersing the materials can be achieved. Taking the metal and alloy materials as examples, under no inert gas protection, the composite material of graphene and lead, tin, zinc, aluminum or aluminum alloy can be manufactured at the plasticizing temperature lower than 700° C.; under the inert gas protection, the composite material of graphene and copper or copper alloy can be manufactured at the plasticizing temperature lower than 1100° C.

Figure 2A:
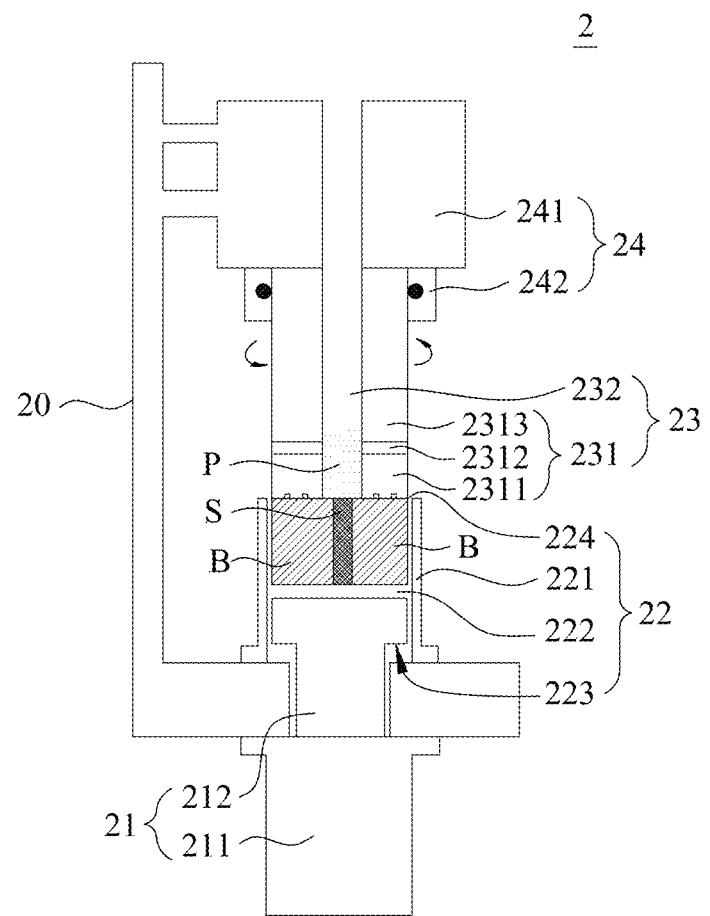
FIG. 2A is a schematic side cross-sectional view of a composite material manufacturing equipment of the first embodiment of the present application.
Figure 2B:
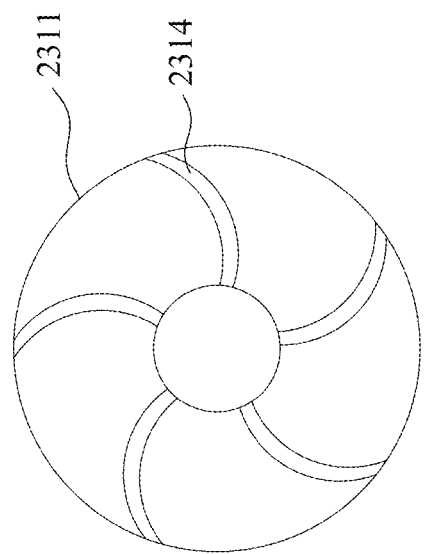
FIG. 2B is a schematic view of a radial appearance of the outer mold shown in FIG. 2A.

FIG. 2A is a schematic side cross-sectional view of a composite material manufacturing equipment of the first embodiment of the present application, FIG. 2B is a schematic view of a radial appearance of an outer mold shown in FIG. 2A. As shown in FIGS. 2A and 2B, a composite material manufacturing equipment 2 includes a support frame 20, an oil hydraulic piston 21, a raw material cylinder 22, a rotating mold 23 and a power unit 24, the oil hydraulic piston 21 includes an oil hydraulic cylinder 211 and a piston 212; the raw material cylinder 22 includes a raw material cylinder body 221, a raw material chamber 222, and a material inlet 223 and a material outlet 224 located at opposite sides of the raw material chamber 222; the rotating mold 23 includes an outer mold 231 and a rotating flow channel 232 located inside the outer mold; the power unit 24 includes a motor gear box 241 and a ball bearing 242. The raw material chamber 222 can be filled with a substrate B and a reinforcing phase material S, the oil hydraulic piston 21 is arranged at the side of the material inlet 223 of the raw material cylinder 22, the rotating mold 23 is arranged at the side of the material outlet of the raw material cylinder 22. The piston 212 can push the substrate B and the reinforcing phase material S to move towards the material outlet 224, the power unit 24 can drive the rotating mold 23, wherein the outer mold 231 rotationally rubs the substrate B then plasticizes the substrate B, and the rotating flow channel 232 disperses and mixes the plasticized substrate B and the reinforcing material S to form a composite material.

The substrate B is metal, alloy or polymer, wherein the metal can be selected from at least one of lead, tin, zinc, aluminum and copper; the alloys is, for example, but not limited to, aluminum alloys, copper alloys; the polymer is, for example, but not limited to, polyethylene (PE), polypropylene (PP), acrylic copolymers, polyethylene terephthalate (PET), polyimide (PI), acrylonitrile-butadiene-styrene copolymer (ABS), polyether ether ketone (PEEK), nylon, etc. The reinforcing phase material S is carbon nanotubes, graphene or nanoceramics.

In this embodiment, the outer mold 231 of the rotating mold 23 includes a rubbing part 2311, a heat insulating part 2312 and a forming part 2313, the heat insulating part 2312 is sandwiched between the rubbing part 2311 and the forming part 2313, the rotating flow channel 232 passes through the rubbing part 2311, the heat insulating part 2312 and the forming part 2313, an inlet of the rotating flow channel 232 is located at the rubbing part 2311, an outlet of the rotating flow channel 232 is located at the forming part 2313, a plurality of spiral guide grooves 2314 is formed on a surface of the rubbing part 2311, the plurality of the spiral guide grooves 2314 communicates with the rotating flow channel 232.

A process of manufacturing the composite material by using the composite material manufacturing equipment 2 includes following steps. The columnar substrate B has a hole drilled along its axial direction according to a predetermined weight ratio of the reinforcing phase material S, and the hole is filled with the reinforcing phase material S. The substrate B and the reinforcing phase material S are placed into the raw material chamber 222. The power unit 24 drives the rotating mold 23 counterclockwise rub the substrate B with high torque, to allow a temperature of the substrate B rise to the critical temperature Tc for plasticization, thereby forming a thixotropic plasticized substrate. The piston 212 of the oil hydraulic unit 21 pushes and squeezes the plasticized substrate and the reinforcing phase material S with a constant stroke, the plasticized substrate is mixed with the reinforcing phase material through the plurality of spiral guide grooves 2314 on the surface of the rubbing part 2311 and they enters the rotating flow channel 232, thereby forming a slurry P of the plasticized substrate and the reinforcing material. The oil hydraulic piston 21 pushes and squeezes the slurry P to move upward against gravity, and an inner wall of the rotating flow channel 232 applies a shear force to the slurry P on the rotating direction at the same time, so that the reinforcing phase material S gradually form a spiral arrangement in the plasticized substrate during the slurry P moving upward by torsion. The heat insulating part 2312 can effectively prevent the high temperature generated by the rubbing part 2311 from being conducted to the forming part 2313. The slurry P passing through the forming part 2313 is gradually cooled down, thereby forming the composite material. The oil hydraulic piston 21 pushes the composite material out of the rotating flow channel 232, and thus a columnar composite material is obtained.

Figure 3A:
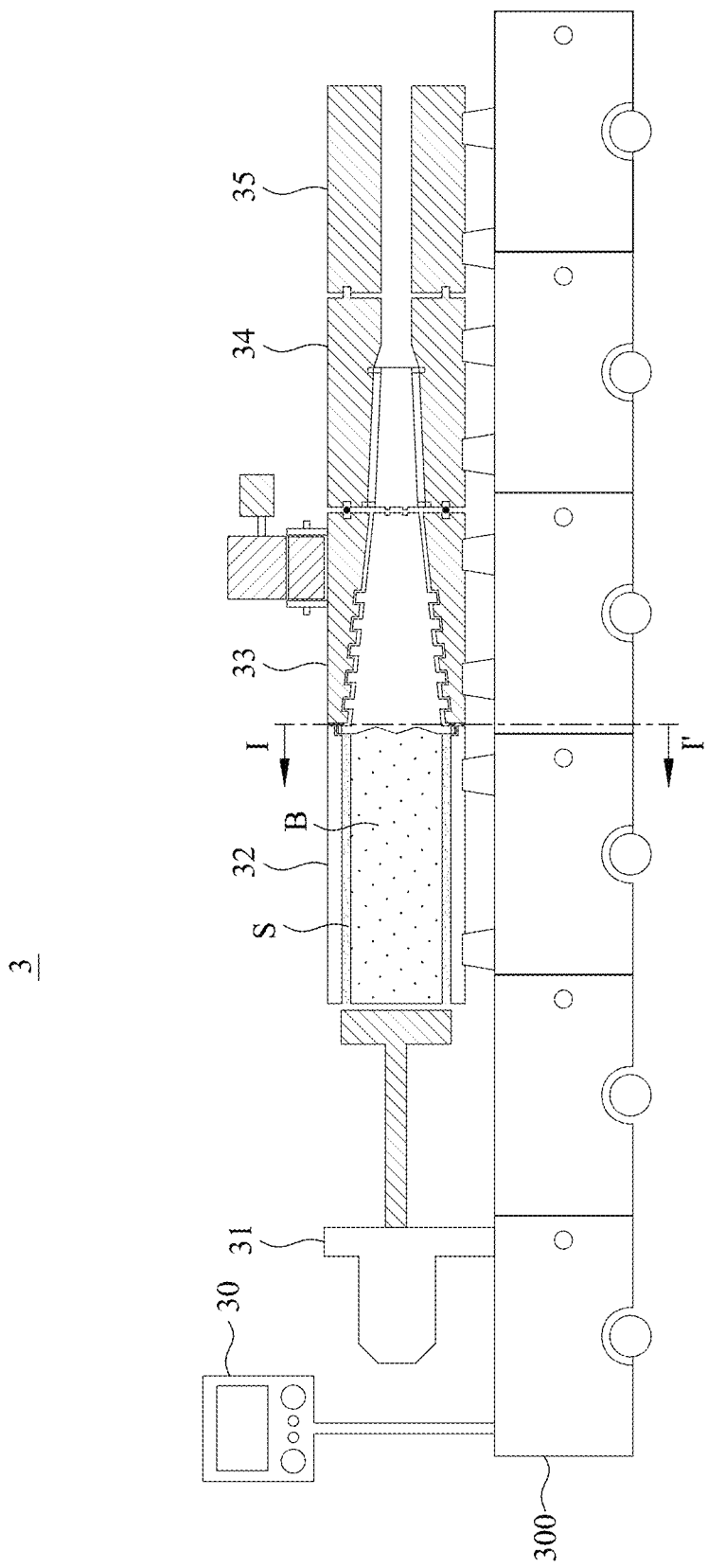
FIG. 3A is a schematic side cross-sectional view of a composite material manufacturing equipment of the second embodiment of the present application.
Figure 3B:
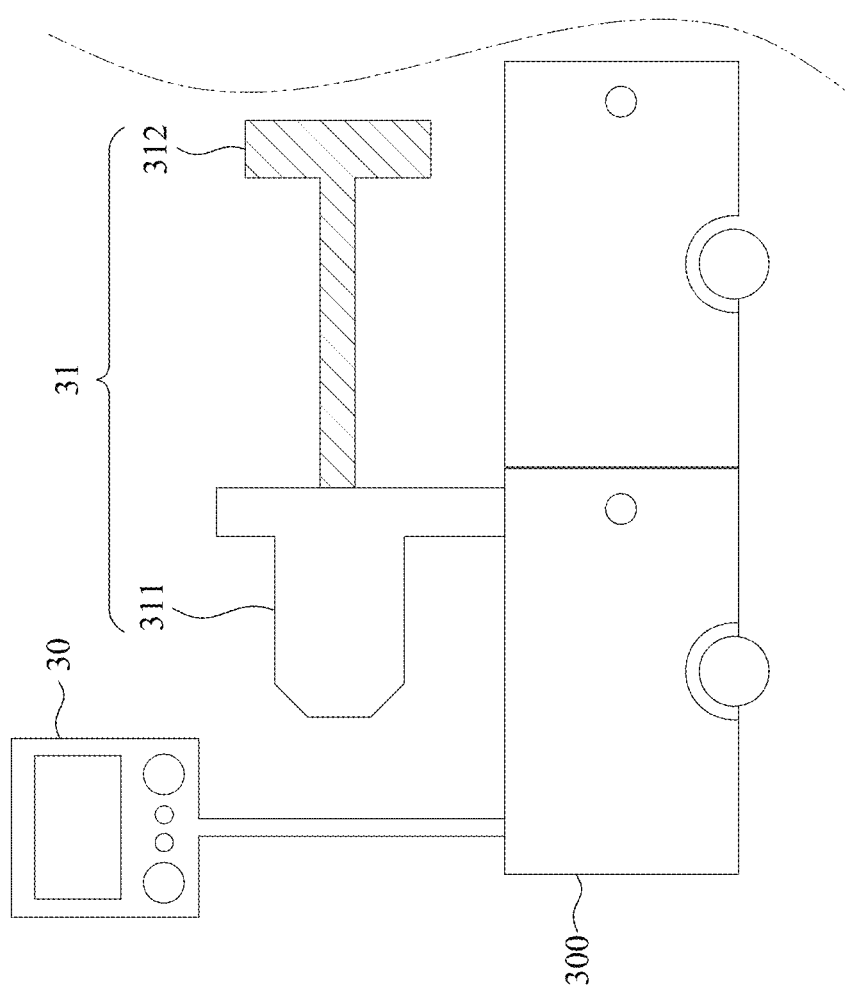
FIG. 3B is a schematic side cross-sectional view of an oil hydraulic piston shown in FIG. 3A.
Figure 3C:
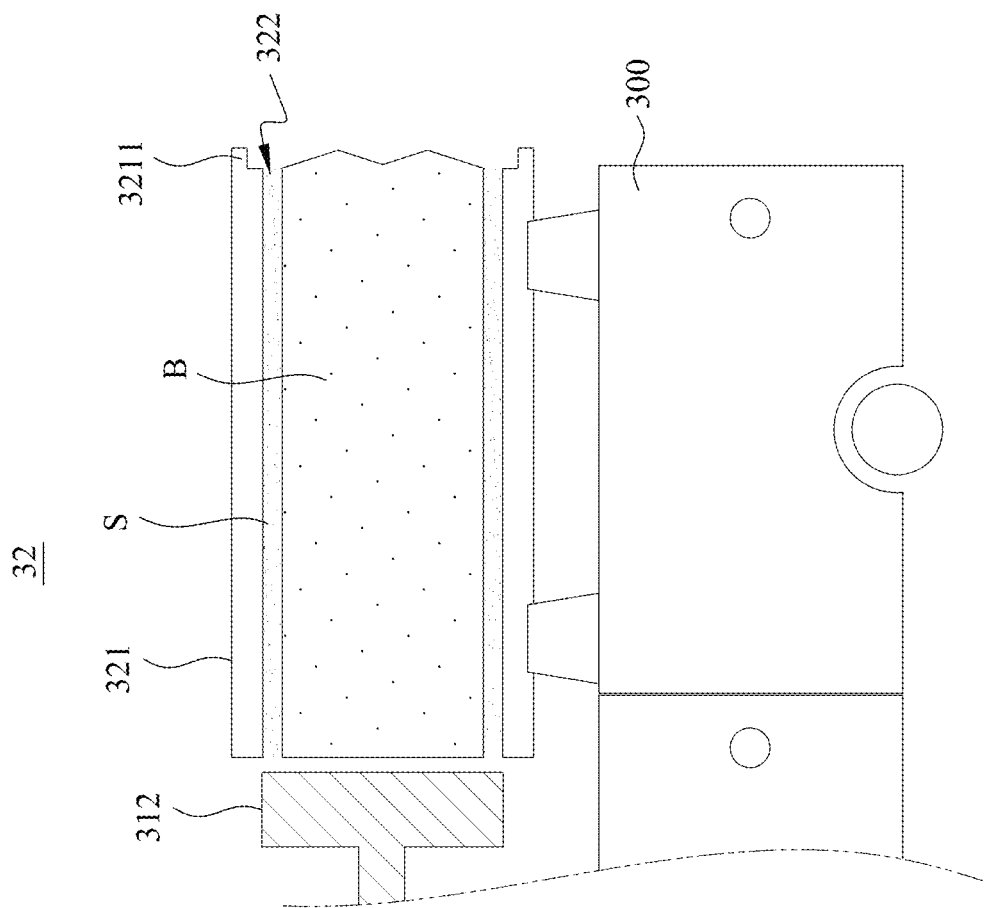
FIG. 3C is a schematic side cross-sectional view of a raw material cylinder shown in FIG. 3A.
Figure 3D:
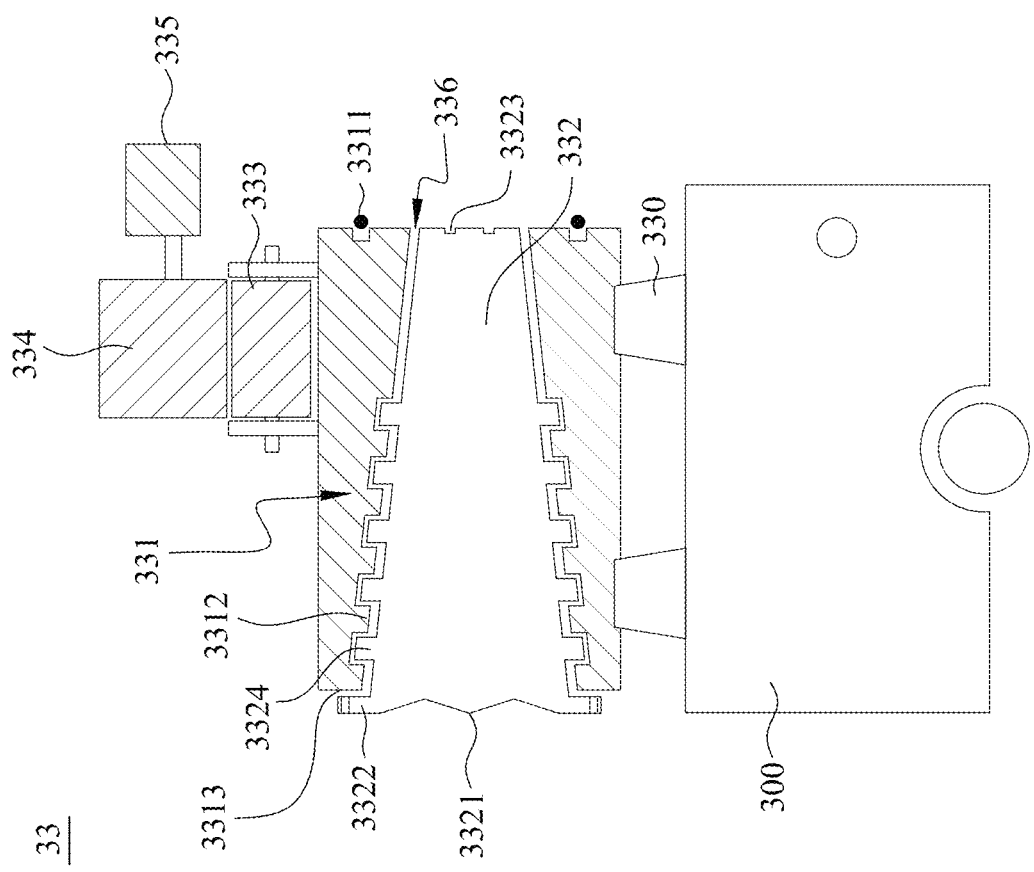
FIG. 3D is a schematic side cross-sectional view of a rotating mold shown in FIG. 3A.
Figure 3E:
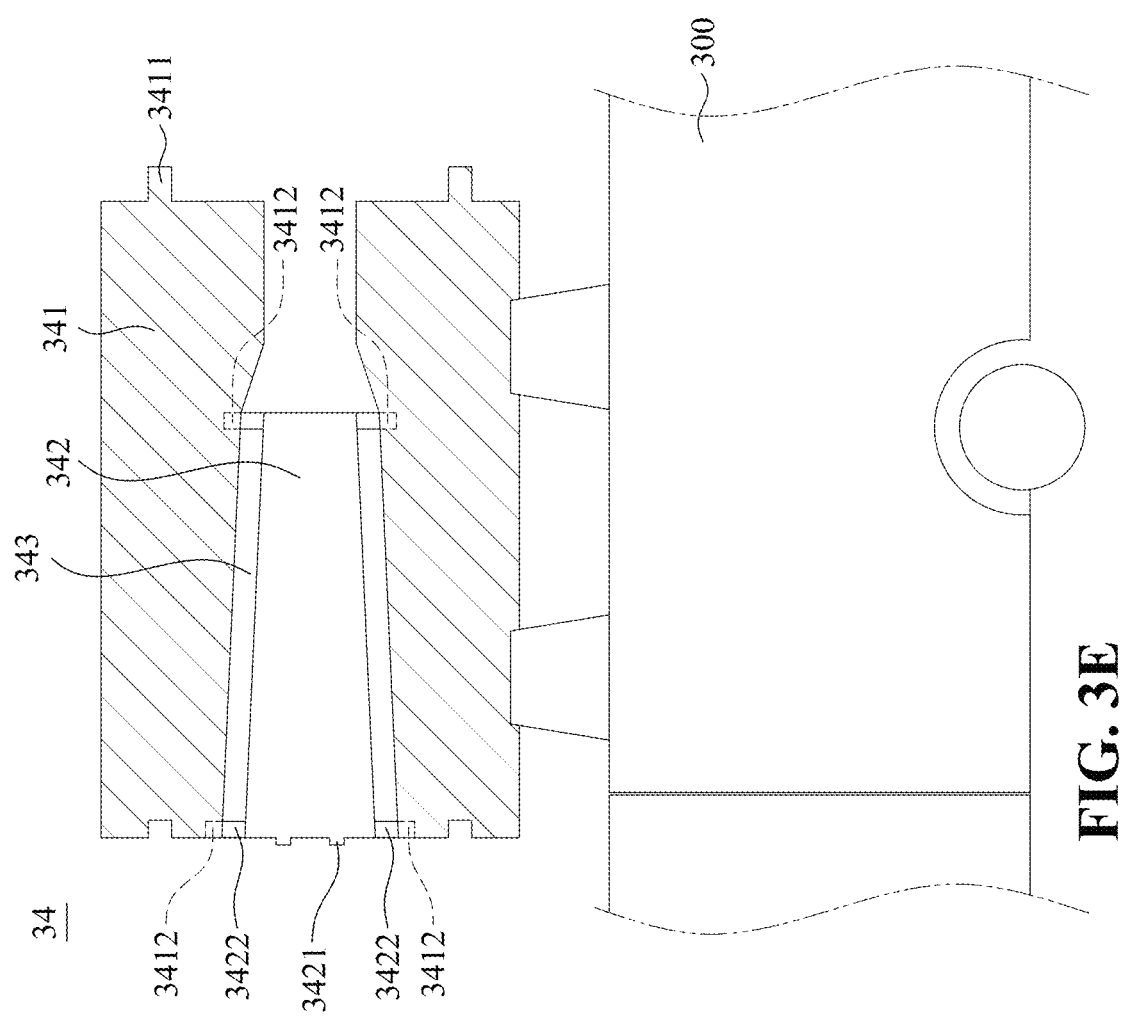
FIG. 3E is a schematic side cross-sectional view of a cooling mold shown in FIG. 3A.
Figure 3F:
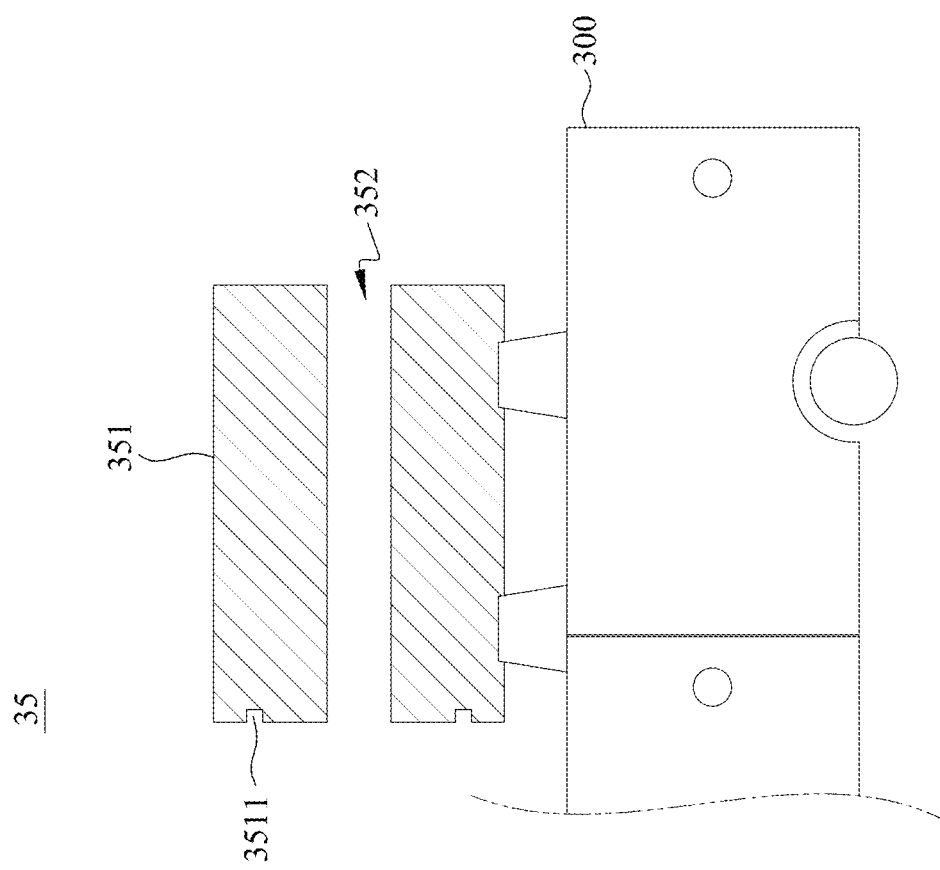
FIG. 3F is a schematic side cross-sectional view of a forming mold shown in FIG. 3A.
Figure 3G:
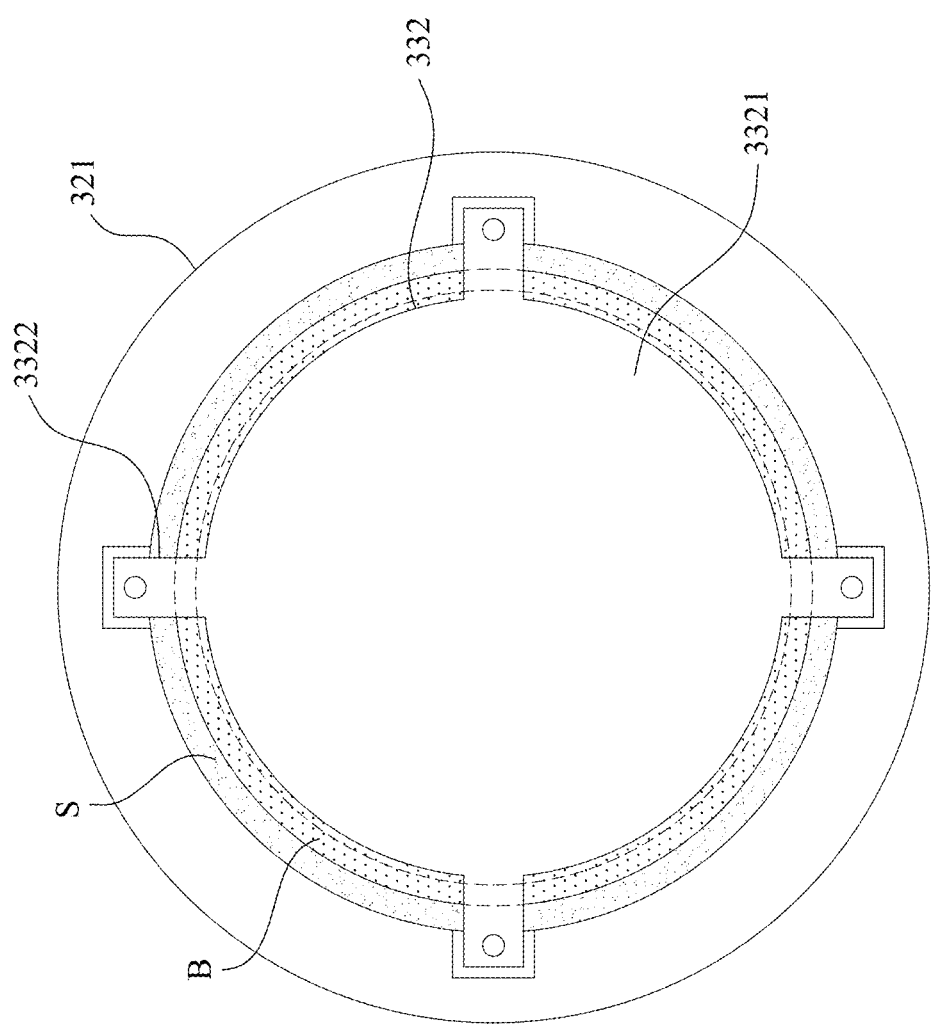
FIG. 3G is a schematic side cross-sectional view of I-I' section shown in FIG. 3A.
Figure 3H:
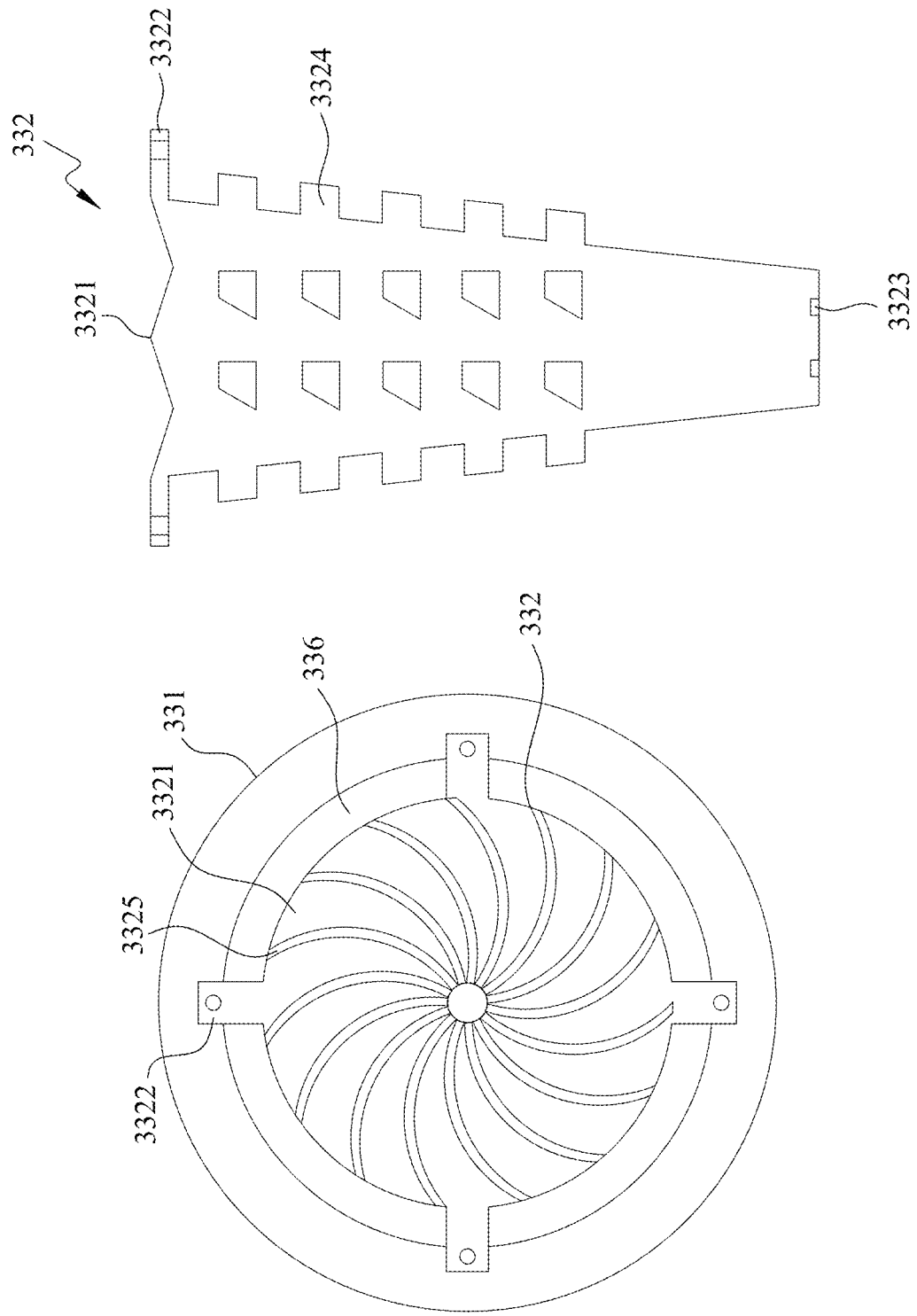
FIG. 3H is a schematic view of radial and axial appearances of a first inner mold shown in FIG. 3C.

FIG. 3A is a schematic side cross-sectional view of a composite material manufacturing equipment of the second embodiment of the present application, FIG. 3B is a schematic side cross-sectional view of an oil hydraulic piston shown in FIG. 3A, FIG. 3C is a schematic side cross-sectional view of a raw material cylinder shown in FIG. 3A, FIG. 3D is a schematic side cross-sectional view of a rotating mold shown in FIG. 3A, FIG. 3E is a schematic side cross-sectional view of a cooling mold shown in FIG. 3A, FIG. 3F is a schematic side cross-sectional view of a forming mold shown in FIG. 3A, FIG. 3G is a schematic side cross-sectional view of I-I' section shown in FIG. 3A, and FIG. 3H is a schematic view of radial and axial appearances of the first inner mold shown in FIG. 3C.

As shown in FIGS. 3A and 3B, a composite material manufacturing equipment 3 includes a control unit 30, an oil hydraulic piston 31, a raw material cylinder 32, a rotating mold 33, a cooling mold 34 and a forming mold 35, the control 30 is connected to the oil hydraulic piston 31, the raw material cylinder 32, the rotating mold 33, the cooling mold 34 and the forming mold 35; the oil hydraulic piston 31, the raw material cylinder 32, the rotating mold 33, the cooling mold 34 and the forming mold 35 are arranged horizontally, and fixed on a movable carrying platform 300. The oil hydraulic piston 31 is arranged at a side of a material inlet of the raw material cylinder 32, the rotating mold 33 is arranged at a side of a material outlet of the raw material cylinder 32. Parameters for operation of the equipment (for example, the pushing and squeezing pressure of the piston, the rotation speed of the rotating mold) can be input and adjusted in the control unit 30. The oil hydraulic piston 31 includes an oil hydraulic cylinder 311 and a piston 312, wherein the oil hydraulic cylinder 311 can drive the piston 312 push and squeeze the raw material in the raw material cylinder 32 to move towards the rotating mold 33.

As shown in FIGS. 3A and 3C, the raw material cylinder 32 of the composite material manufacture equipment 3 includes a raw material cylinder body 321 and a raw material chamber 322, the raw material cylinder body 321 and the piston 312 are in a form of cylinder, an inner diameter of the raw material chamber 322 corresponds to an outer diameter of the piston 312. The raw material cylinder body 321 is made of materials with high melting point and high strength, such as metal alloys like tungsten, manganese, molybdenum, or ceramic alloys like tungsten carbide, and thus can withstand the pushing and squeezing of the piston 312 without deformation. Four inwardly retracted threaded holes 3211 are formed on a side of the raw material cylinder body 321 connected to the rotating mold 33. The raw material chamber 322 can accommodate the substrate B in a form of column and the reinforcing phase material S in a form of powder.

As shown in FIGS. 3A and 3D, the rotating mold 33 of the composite material manufacture equipment 3 includes a first outer mold 331, a first inner mold 332, a speed change gear 333, a coupling gear set 334, and a variable frequency motor 335, the first outer mold 331 is disposed on a rolling bearing 330, and can be opened and closed by 180° for assembly and cleaning. The first inner mold 332 is disposed inside the first outer mold 331. Two sides of the first inner mold 332 are respectively connected to the raw material cylinder 32 and the cooling mold 34. The speed change gear 333 meshes with the ratchets (not shown) of the first outer mold 331 and the coupling gear set 334, respectively. The speed change gear 333, the coupling gear set 334, and the variable frequency motor 335 are fixed on the carrying platform 300 by bolts, respectively. The variable frequency motor 335 is connected to the coupling gear set 334, and the variable frequency motor 335 can drive the first outer mold 331 to rotate through the coupling gear set 334 and the speed change gear 333.

The first outer mold 331, which is in a cone shape, has a thickness gradually increasing from the side of the raw material cylinder 32 to the side of the cooling mold 34 (along the axial direction). A feed port with a greater opening size and a discharge port with a less opening size are formed at two sides of the first outer mold 331 on its radial direction, respectively. A side wall at the feed port of the first outer mold 331 is aligned with the raw material cylinder 321. A circular groove is formed on the side wall at the discharge port of the first outer mold 331, wherein a rotating shaft 3311 is provided in the circular groove. The first outer mold 331 has inner lugs 3312 formed on an inner surface thereof from the feed port to the middle section. The first outer mold 231 can be opened and closed by 180° along the axial direction for facilitating assembly and cleaning. The first inner mold 332 has a conical surface 3321 protruding beyond the feed port of the first outer mold 331 formed on the side facing the raw material cylinder 32, a periphery of the conical surface 3321 is provided with four ribs 3322, and each of the ribs 3322 is provided with a through hole thereon for bolts to pass through. A vertical surface of the first inner mold 332 facing the cooling mold 34 is aligned with the discharge port of the first outer mold 331, wherein a groove 3323 is formed on the vertical surface. The first inner mold 332 has outer lugs 3324 formed on an outer surface thereof from the conical surface 3321 to the middle section. The four ribs 3322 of the first inner mold 332 are aligned with and inserted into the four threaded holes 3211 of the raw material cylinder body 321, such that the first inner mold 332 and the raw material cylinder body 321 are fixed with bolts. The groove 3323 of the first inner mold 332 is coupled to the cooling mold 34, such that the first inner mold 332 is fixed to the raw material cylinder 32 and the cooling mold 34 at two sides thereof, respectively; then the side wall at the feeding port of the first outer mold 331 is attached to the side wall of the raw material cylinder body 321. When the first outer mold 331 is closed, the first outer mold 331 and the first inner mold 332 are separated by a distance not greater than 5 cm, and the inner lugs 3312 of the first outer mold 331 and the outer lugs 3324 of the first inner mold 332 are in a stagger arrangement. Due the first outer mold 331 and the first inner mold 332 are cone-shaped, a rotating flow channel 336 extending at an oblique angle of 15-30° with respect to the horizontal direction is formed between the first outer mold 331 and the first inner mold 332. The first outer mold 331 and the first inner mold 332 are each made of materials with high melting point and high strength (such as metal alloys like tungsten, manganese, molybdenum, or ceramic alloys like tungsten carbide), and thus can withstand the high temperature and stress generated during rubbing the substrate without deformation.

As shown in FIGS. 3A and 3E, the cooling mold 34 of the composite material manufacturing equipment 3 includes a second outer mold 341 and a second inner mold 342. The second outer mold 341 has a thickness gradually increases from the side connected to the rotating mold 33 to the side connected to the forming mold 35 (along an axial direction). A feed port with a greater opening size and a discharge port with a less opening size are formed on two sides of the second outer mold 341 on its radial direction, respectively. The opening size of the feed port of the second outer mold 341 is equal to that of the discharge port of the first outer mold 331. A circular groove is formed on the side wall at the feed port of the second outer mold 341, and the rotating shaft 3311 is accommodated in the circular groove. A bump 3411 is formed on the side wall at the discharge port of the second outer mold 342, and the bump 3411 can be coupled to the forming mold 35. A bump 3421 is formed on the side of the second inner mold 342 facing the rotating mold 33, and the bump 3421 can be coupled to the groove 3323 of the first inner mold 331. The second inner mold 342 is provided with four ribs 3422 at each of two opposite sides, and threaded holes 3412 corresponding to the ribs 3422 are formed on the second outer mold 341, such that the second outer mold 341 and the second inner mold 342 are fixed with bolts. A cooling flow channel 343 extending at an oblique angle of 15-30° with respect to the horizontal direction is formed in the gap of about 3 cm between the inner surface of the second outer mold 341 and the outer surface of the second inner mold 342. By aligning and attaching the feed port of the second outer mold 341 to the discharge port of the first outer mold 331, the rotating flow channel 336 and the cooling flow channel 343 can be communicated with each other. The portion of each rib 3422 exposed to the cooling flow channel 343 is processed into a round shape, which can prevent the graphene-substrate slurry from accumulating and then blocking the passing of graphene-substrate slurry through the cooling flow channel 343.

As shown in FIGS. 3A and 3F, the forming mold 35 of the composite material manufacturing equipment 3 includes a finished product cylinder 351 and a finished product chamber 352 inside the finished product cylinder 351. The finished product cylinder 351 is made of materials with high melting point and high strength, and the finished product cylinder 351 can be opened and closed along the axial direction. A groove 3511 is formed on a side wall of the finished product cylinder 351 facing the cooling mold 34, and the groove 3511 can be coupled to the bump 3411 of the second outer mold 341. A size of an inner diameter of the finished product chamber 352 is equal to the opening size of the discharge port of the second outer mold 341.

In this embodiment, the substrate B can be formed as a single column or a plurality of columns (circular column, corner column), the outer diameter and volume of the columnar substrate B are less than the inner diameter and volume of the raw material chamber 322, the columnar substrate B is placed into the raw material chamber 222, and then the raw material chamber 322 is filled up with the reinforcing phase material S (that is, the gap between the columnar substrate B and the raw material cylinder body 321 is filled with the reinforcing phase material S) to cover the columnar substrate B; alternatively, the substrate can be made into the columnar substrate with the diameter same as the inner diameter of the raw material chamber 322, one or more filler hole(s) with a same diameter is(are) formed along the axial direction of the columnar substrate with a drilling tool, and then the reinforcing phase material are filled into the filler hole(s). By using the columnar substrate as the raw material, it is easy to control and adjust the relative weight ratio of the substrate B to the reinforcing phase material S in the composite material.

FIG. 3G is a schematic cross-sectional view of section I-I' in FIG. 3A. As shown in FIGS. 3A, 3D and 3G, a recess that fits the shape of the conical surface 3321 and the ribs 3322 of the first inner mold 332 is formed on the side of the substrate B facing the rotating mold 33. The ribs 3322 of the first inner mold 332 are fixed into the inwardly retracted threaded holes 3211 of the raw material cylinder body 321; meanwhile, the conical surface 3321 of the first inner mold 332 is embedded into the recess of the substrate B. A portion of the periphery of the recess of the substrate B exposed to the first inner mold 332 is aligned with the vertical surface of the side wall of the raw material cylinder body 321. The thickness of the side wall at the feed port of the first outer mold 331 is greater than the thickness of the side wall of the raw material cylinder body 321, so that a rubbing part 3313 (the location illustrated by the dotted line shown in FIG. 3G) is formed on the side wall at the feed port of the first outer mold 331 that extends beyond the side wall of the raw material cylinder body 321, the rubbing part 3313 can be attached to the exposed portion of the substrate B and the reinforcing phase material S. When the variable frequency motor 335 is started to drive the first outer mold 331 to rotate, the plasticized substrate is formed due to the high heat generated by the rubbing part 3313 of the side wall of the first outer mold 331 rotationally rubbing the exposed portion of the substrate B, and then the piston 312 pushes and squeezes the plasticized substrate and the reinforcing phase material S into the rotating flow channel 336.

FIG. 3H is a schematic view of the radial and axial appearances of the first inner mold shown in FIG. 3D. As shown in FIGS. 3A, 3D and 3H, the conical surface 3321 of the first inner mold 332 is in close contact with the surface of the recess of the substrate B, and a plurality of spiral guide grooves 3325 is formed on the conical surface 3321, wherein the depth of the spiral guide grooves 3325 is not greater than 5 mm. The first outer mold 331 rotationally rubs the substrate B around the first inner mold 332 to form the plasticized substrate, the piston 312 pushes and squeezes the plasticized substrate and the reinforcing phase material S into the rotating flow channel 336 along the spiral guide grooves 3325. In the rotating flow channel 336, the heights of the inner lugs 3312 of the first outer mold 331 and the outer lugs 3324 of the first inner mold 332 are about 1 to 3 cm, the staggered inner lugs 3312 and outer lugs 3324 rotate relative to each other, thereby generating the shear force that continuously rubs and stirs the plasticized substrate and the reinforcing phase material, to allow the crystallization and eutectic crystal of the plasticized substrate be gradually fined, thereby producing a thixotropic slurry. The fined crystal grains of the substrate in the thixotropic slurry are not connected to each other, such that the reinforcing phase material can be dispersed among the crystal grains of the substrate without agglomeration. Due to the pushing and squeezing pressure of the piston 312 and the shear force generated by the rotating flow channel 336, the reinforcing phase material and the crystal grains of the plasticized substrate pass through the rotating flow channel 336 in a spiral arrangement. The thixotropic slurry passing through the cooling flow channel 343 is gradually cooled to be a semi-solid composite material, and the reinforcing phase material in a spiral arrangement and connected with each other are gradually fixed on the surface of the crystal grains of the substrate. Due to the pushing and squeezing pressure of the piston 312, the semi-solid composite material is further extruded into the forming mold 35 then solidified, and a columnar composite material is formed. There is no occurring of phase separation between the reinforcing phase material and the substrate, such that the composite material possesses excellent properties of the reinforcing phase material.

As mentioned above, the graphene is the reinforcing phase material which is the most difficult to be uniformly dispersed in the substrate, the composite material manufacturing equipment of the present application will be specifically illustrated with following embodiments of the graphene, so that those skilled in the art can more clearly understand the technology and effects of the present application.

Embodiment 1: A Graphene-Metal Copper Composite Material

The raw materials include: 0.5 wt % of graphene sheets (multilayer graphene powder P-ML20 produced by Enerage Inc. with a carbon content >99%, a specific surface area of 45 m$^2$/g, an average thickness of about 3 nm, an average diameter of about 8 mm); and 99.5 wt % of electrolytic copper (with copper purity >99.5%, which is formed as metal copper column with a diameter of 9 cm). By using the aforesaid composite material manufacturing equipment 2, the copper rod is rubbed at 200 rpm with a rotating mold until it reaches 750° C., and pushed to advance 10 mm per minute by the oil hydraulic piston with a force of 50 kilonewtons (kN), and thus a graphene-metal copper composite material is obtained.

Figure 4A:
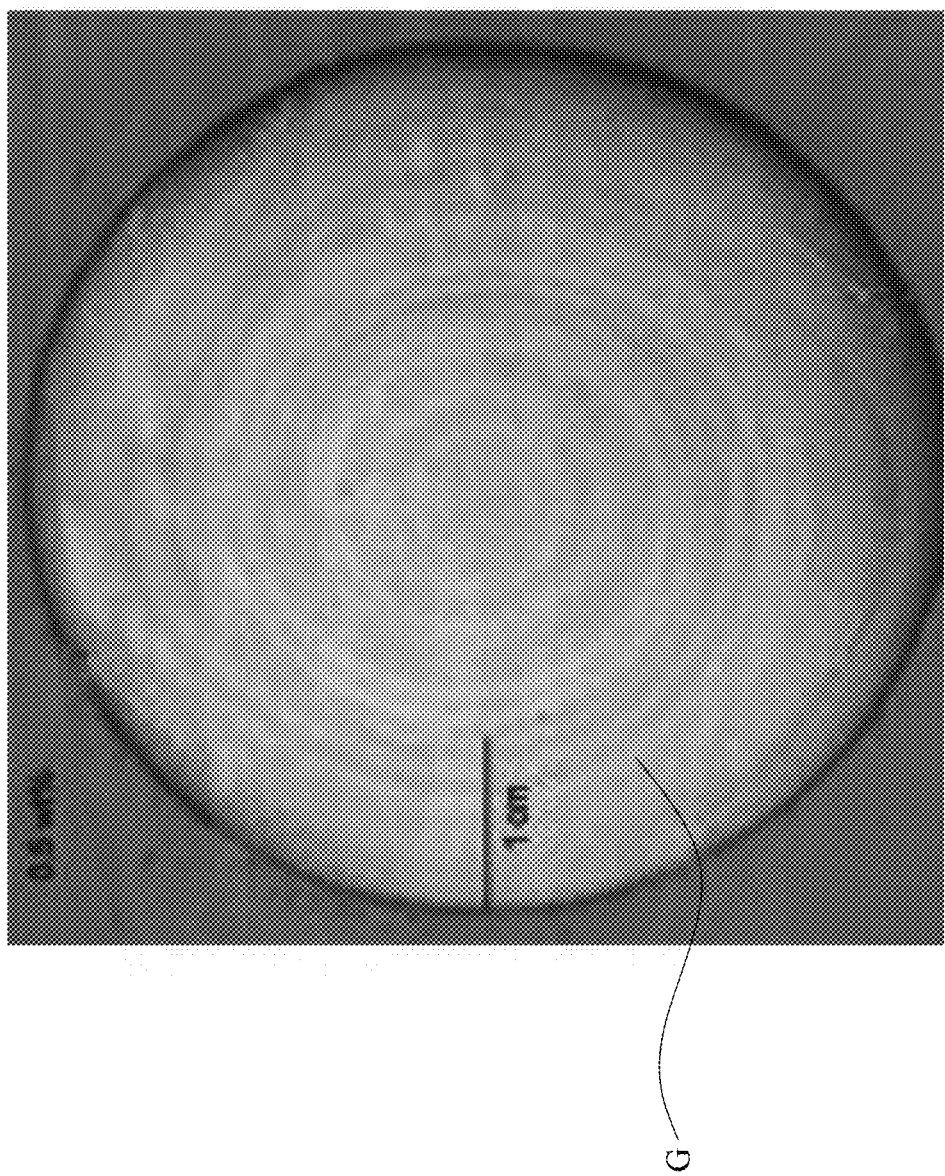
FIG. 4A is an optical microscope image of a cross-section of a graphene-metal copper composite material of this Embodiment.
Figure 4B:
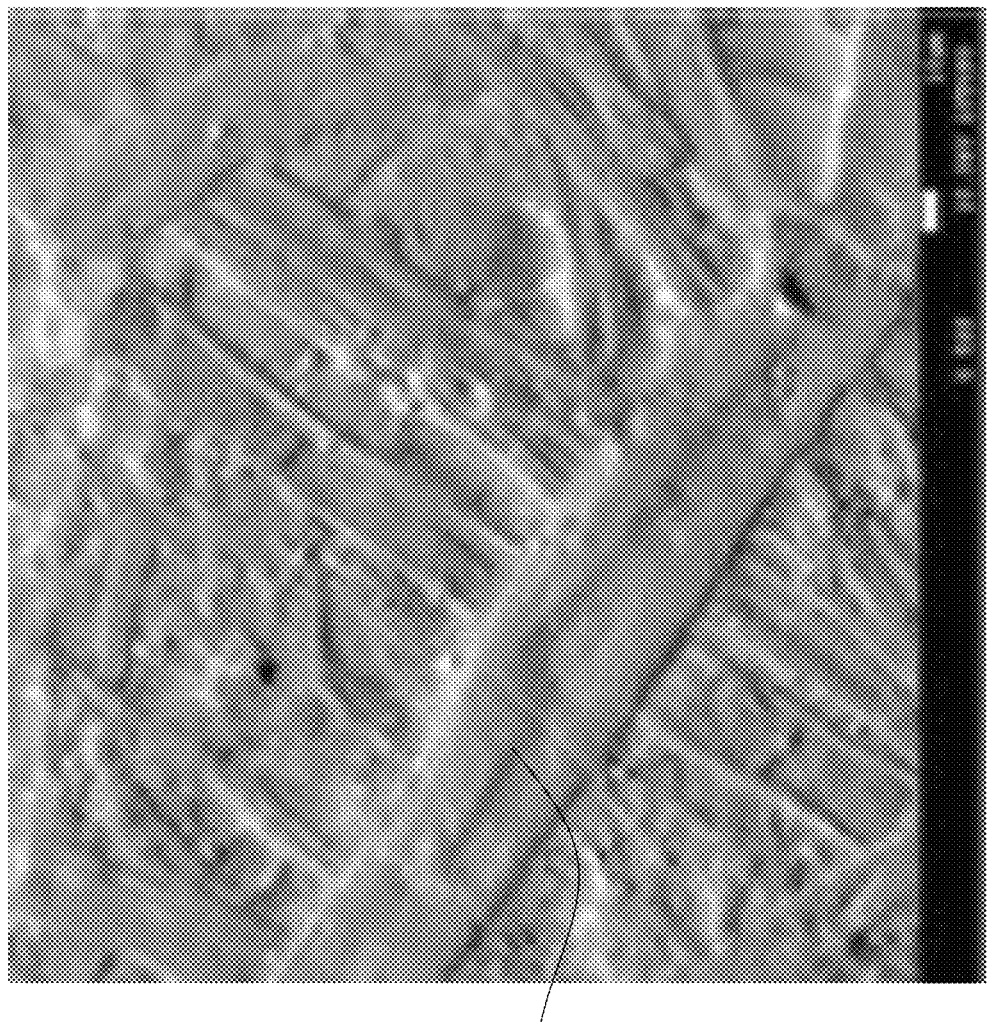
FIG. 4B is an electron microscope image of a cross-section of the graphene-metal copper composite material of this embodiment.

FIG. 4A is an optical microscope image of a cross-section of the graphene-metal copper composite material of this Embodiment; FIG. 4B is an electron microscope image of a cross-section of the graphene-metal copper composite material of this embodiment. As shown in FIG. 4A, the composite material of graphene and metal copper includes a metal copper column and graphene sheets G, it can be clearly observed that the graphene sheets form a plurality of circular patterns of different radii on a radial section of the metal copper column; moreover, as shown in FIG. 4B, it can be observed that there is no phase separation between the graphene sheets G and the metal copper. It is noted that a plurality of graphene sheets interconnections in a spiral arrangement along the axial direction of the metal copper column can be observed (not shown). The uniformly distributed graphene sheets interconnection can provides the inherently excellent properties of graphene, such that the graphene-metal copper composite material has the properties of electrical conductivity, thermal conductivity, and mechanical strength higher than those of metal copper, thereby the composite material can be subsequently processed into required products (such as cooling fin, wires, etc.) by processes such as forging, rolling. The measured results of hardness and electrical conductivity of the metal copper and the graphene-metal copper composite material of this embodiment are shown in Table 1 below.

TABLE 1

| Material | Vickers hardness | Electrical conductivity (ASTM) |
|---|---|---|
| Metal copper | 44 | 57.8 MS/m (99.7% IACS) |
| Graphene-metal copper composite material of | 105 | 60 MS/m (104% IACS) |

Embodiment 2: A Graphene-Aluminum Alloy Composite Material

The raw materials include: 0.5 wt % of graphene sheets (multilayer graphene powder P-ML20 produced by Enerage Inc. with a carbon content >99%, a specific surface area of 45 m$^2$/g, an average thickness of about 3 nm, an average diameter of about 8 mm); and 99.5 wt % of aluminum alloy (ASTM 6061, which is formed as aluminum alloy rod with a diameter of 9 cm). By using the aforesaid composite material manufacturing equipment 3, the aluminum alloy rod is rubbed at 250 rpm with the rotating mold until it reaches 550° C., and pushed to advance 15 mm per minute by the oil hydraulic piston with a force of 45 kilonewtons (kN), and thus a graphene-aluminum alloy composite material is obtained. The uniformly distributed graphene sheets can provides the inherently excellent properties of graphene, such that the graphene-aluminum alloy composite material has the properties of electrical conductivity, thermal conductivity, and mechanical strength higher than those of aluminum alloy, thereby the composite material can be subsequently processed into required products (such as electronic devices and aircraft casings, etc.). The measured results of hardness and thermal conductivity of the aluminum alloy raw material and the graphene-aluminum alloy composite material of this embodiment are shown in Table 2 below.

TABLE 2

| Material | Vickers hardness | Tension | Thermal conductivity (W/m · K) |
|---|---|---|---|
| Aluminum alloy | 75 | 340 MPa | 164 |
| Graphene-aluminum alloy composite material of | 120 | 480 MPa | 240 |

In summary, in the composite material manufacturing equipment of the present application, the raw material chamber of the raw material cylinder can be filled with the substrate in the form of column and the reinforcing phase material in the form of powder, the oil hydraulic piston can push the substrate and the reinforcing phase material to move towards the material outlet, the outer mold of the rotating mold can rotationally rub the substrate to plasticize the substrate, the rotating flow channel can disperse and mix the plasticized substrate and the reinforcing phase material to form the composite material; the manufacturing process thereof does not require heating, the reinforcing phase material is uniformly dispersed in the substrate, and there is no phase separation in the obtained composite material, which can be available for subsequently processing applications in various industries.

The above-mentioned embodiments only exemplify the principles and effects of the present invention, but are not intended to limit the present invention. Any person skilled in the art can modify and change the above-mentioned embodiments without departing from the spirit and scope of the present invention. Therefore, all equivalent modifications, combinations or changes accomplished without departing from the spirit and technical principles disclosed in the present invention by those skilled in the art should falls within the scope of the claims of the present invention.

What is claimed is:

1. A composite material manufacturing equipment, comprising:

a raw material cylinder, having a raw material chamber capable of being filled with a substrate and a reinforcing phase material, and a material inlet and a material outlet located at opposite sides of the raw material chamber, wherein the substrate is in a form of column, and the reinforcing phase material is in a form of powder;

an oil hydraulic piston, arranged at a side of the material inlet of the raw material cylinder, for pushing the substrate and the reinforcing phase material to move towards the material outlet; and a rotating mold, arranged at a side of the material outlet of the raw material cylinder, and comprising an outer mold and a rotating flow channel inside the outer mold, wherein the outer mold rubs the substrate to plasticize the substrate, and the rotating flow channel disperses and mixes the plasticized substrate and the reinforcing phase material to form a composite material, wherein the raw material chamber has a cylindrical space in which a cylindrical piston of the oil hydraulic piston moves, and wherein the outer mold comprises a rubbing part, a heat insulating part and a forming part, the heat insulating part is sandwiched between the rubbing part and the forming part, the rotating flow channel passes through the rubbing part, the heat insulating part and the forming part, an inlet of the rotating flow channel is located at the rubbing part, an outlet of the rotating flow channel is located at the forming part, the rubbing part rotationally rubs the substrate, the heat insulating part insulates heat generated by the rubbing part rotationally rubbing the substrate, and the forming part cools the composite material.

2. The composite material manufacturing equipment according to claim 1, wherein the substrate is metal, alloy or polymer, and the reinforcing phase material is graphene.

3. The composite material manufacturing equipment according to claim 1, wherein a plurality of spiral guide grooves is formed on a surface of the rubbing part, and the plurality of spiral guide grooves communicates with the rotating flow channel.

* * * * *